United States Patent [19]
Soberg et al.

[11] Patent Number: 4,807,564
[45] Date of Patent: Feb. 28, 1989

[54] MULTIPLE DISPOSABLE ANIMAL LITTER CONTAINER

[75] Inventors: Harry W. Soberg, Fargo, N. Dak.; David G. Radtke; Lyle R. Pitsenbarger, both of Moorhead, Minn.

[73] Assignee: Logical, Inc., Fargo, N. Dak.

[21] Appl. No.: 924,012

[22] Filed: Oct. 28, 1986

[51] Int. Cl.$^4$ ............................................. A01K 23/00
[52] U.S. Cl. ........................................ 119/1; 229/103
[58] Field of Search ............... 119/1; 229/103, 23 BT; 206/518, 508

[56] References Cited

U.S. PATENT DOCUMENTS

| | | | |
|---|---|---|---|
| 3,154,052 | 10/1964 | Sweeney | 119/1 |
| 3,581,975 | 6/1971 | Riccio | 119/1 |
| 3,743,170 | 7/1973 | Riccio | 119/1 |
| 3,886,901 | 6/1975 | Zeitter | 119/1 |
| 4,441,451 | 4/1984 | Neal | 119/1 |
| 4,487,163 | 12/1984 | Jobert et al. | 119/1 |
| 4,534,315 | 8/1985 | Sweeny | 119/1 |
| 4,541,360 | 9/1985 | Higgins et al. | 119/1 |

Primary Examiner—John Weiss
Attorney, Agent, or Firm—Schroeder & Siegfried

[57] ABSTRACT

A sales package for litter in the form of a double disposable litter container comprised of two sections which telescope, in closing, to encompass a pair of separate packages of litter and which, when separated, comprise two separate disposable carboard litter boxes, each of which is used with one of the two packages of litter and has improved functional characteristics as to durability and absorption of liquids and odor. Each of the sections fucntions as a separate disposable litter box and is characterized by a plurality of highly absorbent paper panels superimposed upon its bottom panel and a highly porous hard-surfaced scratch-resistant panel having a surface hardness factor of a critical wax strength number range of approximately 8-11 superimposed with respect to the absorbent paper panels, to support the litter and protect the highly absorbent panels against scratching by the animal.

21 Claims, 1 Drawing Sheet

U.S. Patent  Feb. 28, 1989  4,807,564
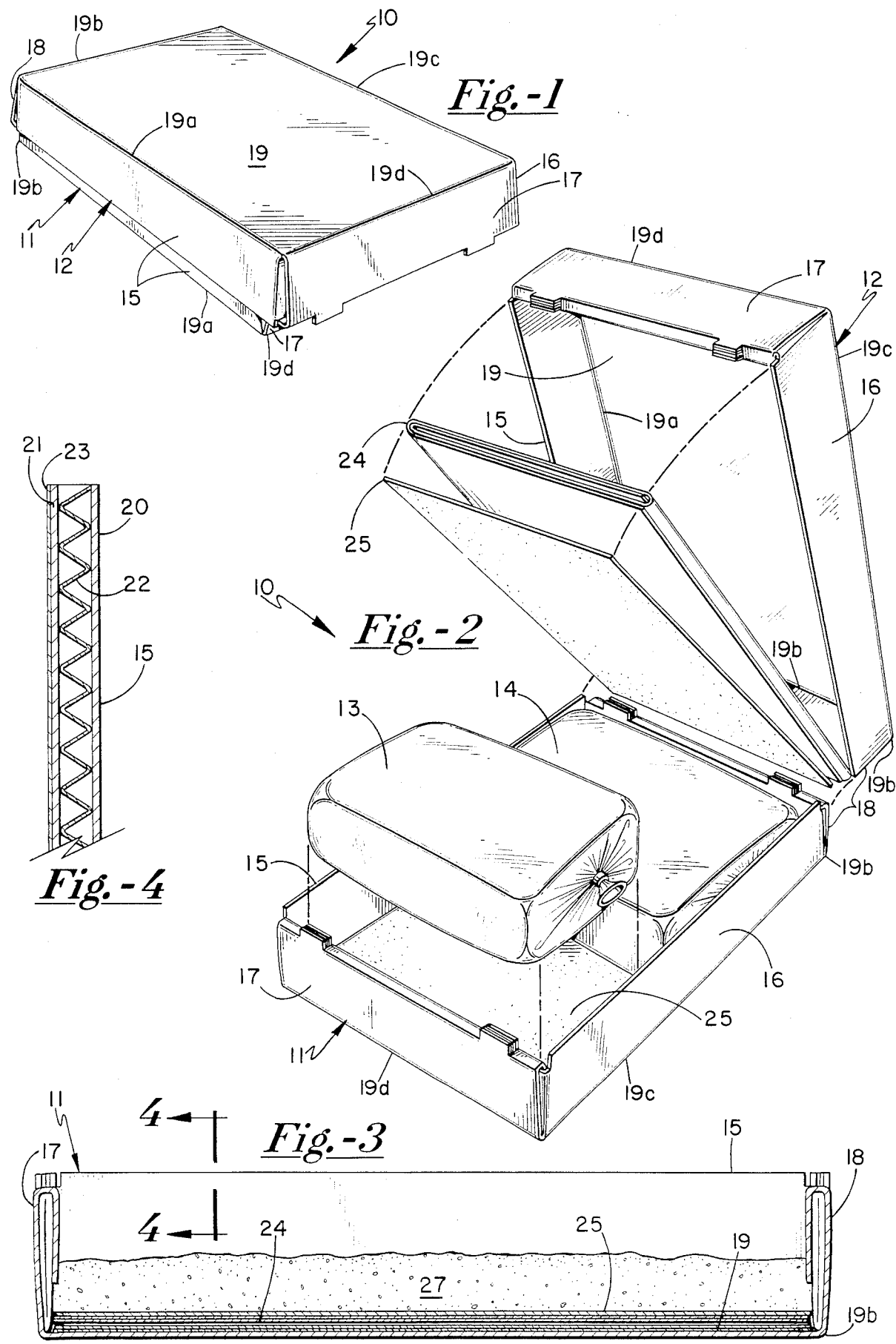

MULTIPLE DISPOSABLE ANIMAL LITTER CONTAINER

BACKGROUND OF PRIOR ART

Litter boxes for animals such as cats are conventionally produced of an impervious material such as some form of plastic. Such a material is utilized to prevent the escape of liquids and the user relies upon the absorbency of the litter to absorb and retain such liquids. Since there is a definite limit to the absorbency of the litter, such boxes frequently have a serious odor problem associated therewith. Thus, there has been a definite and long-standing need for a litter box which will obviate such problems so as to maintain the contents thereof in a dispersed, relatively non-evaporating and absorbed condition. Since cats are known for their inherent tendency to scratch the litter together to cover their body discharges upon completion thereof, and since known paper containers would not withstand such scratching, it has apparently heretofore been assumed that a disposable paper litter box was not practically feasible, and that a plastic or harder and impervious material is required. In any event, to the best of our knowledge, no one has heretofore conceived of a disposable litter box which is both practical and satisfactorily effective. As a consequence, there has been a definite long outstanding need for such a litter box.

BRIEF SUMMARY OF THE INVENTION

We have provided a multiple disposable animal liter box which is both practical and satisfactorily effective, despite the fact it is completely disposable in that it is made entirely of paper, and thus can be readily and easily burned in its entirety. We accomplish these ends by providing a hard surfaced, but porous, scratch panel of chipboard to support the litter, and by incorporating a plurality of panels of highly absorbent newspaper print paper between the said scratch panel and the bottom panel of an all cardboard box. The highly absorbent panels of newspaper print paper draw the liquid through the chipboard and absorb and retain the same, while the hard surface of the chipboard scratch panel prevents the scratching of the cat from tearing up the bottom panel of the box. As a consequence, the disposable box will serve its purpose longer than the type which commonly utilizes only litter within a plastic container, and can be easily disposed of once the highly absorbent panels become saturated, or nearly so.

In conjunction with the above, we have provided a sales package for litter comprising a two-piece litter container having a pair of telescoping sections which enclose a pair of separate packages of litter, and each of which is constructed as described hereinabove and will function separately with one of the packages of litter as a separate disposable litter box.

BRIEF DESCRIPTION OF THE DRAWINGS

A detailed description of one preferred embodiment of the MULTIPLE DISPOSABLE ANIMAL LITTER CONTAINER is hereafter described with specific reference being made to the drawings in which:

FIG. 1 is a perspective view of one embodiment of our MULTIPLE DISPOSABLE ANIMAL LITTER CONTAINER, in closed configuration;

FIG. 2 is a perspective view of the same in open configuration with the outermore section shown in exploded view;

FIG. 3 is a vertical sectional view on an enlarged scale taken through one of the sections of same after the contents of one of the litter bags shown in FIG. 2 have been distributed therewithin; and FIG. 4 is a sectional view on a greater enlarged scale, taken along line 4—4 of FIG. 3.

DETAILED DESCRIPTION OF THE INVENTION

FIG. 1 shows an embodiment of our invention, designated as such by the numeral 10. It is comprised of a lower section 11 which telescopes into the upper section 12. As shown, it is designed to confine a pair of separate bags 13 and 14 of cat litter material. When the container 10 is opened, one of the bags 13 is opened and its contents are distributed within the interior of one of the two sections 11,12 as shown in FIG. 3. The other bag 14 and its contents are reserved for subsequent use within the confines of the other section.

Each of the sections 11 and 12 are constructed similarly, except that the dimensions of lower section 11 are slightly less than those of section 12 and this section 11 telescopes into section 12, as shown in FIG. 1. Each section constitutes a separate litter box, when separated. Each has opposite side walls such as 15, 16, opposite end walls such as 17, 18, and a bottom panel 19 with lateral edges 19a, 19b, 19c and 19d. As shown, each of said walls extend upwardly and outwardly from panel 19. Each section is made of liner board having 200 lb. burst flute thickness, the outer layer 20 and the inner layer 21 being of 42 lb. weight, and the corrugated middle layer 22 being of 26 lb. weight. A wax coating 23 encases the inner liner 21 and the bottom panel 19.

Superimposed in contiguous relation upon the bottom panel 19 of each of the above sections is a plurality of six (6) layers of newspaper print paper sheets 24 which edges extend coextensively with the bottom panel, their edges extending closely adjacent to the side walls 15,16 and end walls 17,18. These paper sheets 24 are highly absorbent, being capable of absorbing 15 lbs. of water per 1000 lbs. of paper.

Each such sheet 24 has an individual water absorbency approximating 530 seconds per 0.01 cc of water with a standard deviation approximating 238. Collectively, the six sheets 24 have a water absorbency approximating 190 seconds per 0.01 cc of water with a standard deviation approximating 40. The collective absorptive capacity of these six sheets 24 approximates 252 and their Cobb size approximates 240.

Water absorbency is measured in seconds per 0.01 cc and is a measure of the time it takes for the material to absorb a drop of water measuring 0.01 cc. The standard deviation indicates the maximum extent of variation of 95% of the tests. Thus, a standard deviation of 40 for a water absorbency of 190, would mean that 95% of the test results would fall within a range of 150-230 seconds per 0.01 cc.

Absorptive capacity is the maximum amount of water a sample can hold, expressed as a percentage of the dry weight of the sample.

"Cobb" size is the mass of water a sample can absorb in two minutes per square meter of sample surface area.

The reason the six panels 24 have a greater water absorbency than a single panel is that water is absorbed more rapidly in a transverse direction of the sheet, than in the plane of that sheet. Thus, a greater part of the drop of water being measured will move vertically or transversely through the six sheets than through a single sheet. As a consequence, it will take less time for the drop of water to be completely absorbed by the six sheets.

Superimposed upon the paper sheets 24, also in closely adjacent relation to the bottom panel 19 and contiguous to the sheets 24, is a panel 25 of scratch-resistant chipboard which is strong and very porous and has an outer surface which has a hardness factor of a critical wax strength number of approximately 8-11. The panel itself has a water absorbency of approximately 45-51 seconds. The panel 25 is made of what is called chip grade chipboard, which is imperforate as shown in FIGS. 2, 3 and grey in color, is 0.030 inch in thickness, and weighs approximately 103 lbs. per 1000 sq. ft. (basis weight). It has approximately 5% moisture content by weight. It, too, is coextensive in dimensions with the bottom panel 19 and is superimposed relative thereto.

It is important that the layers of paper 24 be of highly absorbent material and that is why we use newspaper print paper, because it necessarily must absorb liquids very rapidly. It is imperative that the panel 25 have a hard outer surface and that it be porous to permit the moisture to pass readily therethrough. The hard outer surface 26 of the panel has been tested by the Institute of Chemistry of Appleton, Wis., which is the leading authority on properties of paper in the country. Listed below are the properties found in the tests performed by that agency upon an upper and lower chipboard panel 25 as used by us.

|  | TOP PANEL | BOTTOM PANEL |
|---|---|---|
| Critical Wax Strength No. | | |
| Wire Side | 8 | 11 |
| Felt Side | 9 | 9 |
| Water Absorbency | | |
| Wire Side | 49 | 56 |
| Felt Side | 45 | 51 |
| Moisture, Percent % | 6.2 | 6.3 |

The hardness factor of a surface is appropriately expressed in terms of its critical wax strength number. The critical wax strength number is a number determined in accord with TAPPI Method T459. In this test, calibrated sealing waxes with increasing adhesive power are pulled from the surface of the specimen. The higher the number, the greater are the adhesive qualities of the wax. The highest number of the wax in the series which does not disturb the surface of the paper, is the numerical rating of the pick. Thus, on performing the test, the different sticks of wax are heated at one end and applied to the surface to be tested. After the wax has cooled, the sticks are removed. The stick which bears the highest number, and does not disturb the surface of the specimen, indicates the critical wax strength number of the specimen. In the test above, the highest number of the sticks which did not disturb the "wire side" of the top panel was 8.

In the production of chipboard, the latter is made from a slurry which is discharged evenly over a wire screen to permit the liquid to be separated. The upper surface of the chipboard material or etained upon the screen is then pressed with a felt surface to squeeze the remaining liquid out. The upper surface is, therefore, referred to as the "felt side" and the lower surface which is supported by the screen is referred to as the "wire side".

It is also important that the panel 25 be porous so that it will readily absorb moisture. The water absorbency tests reflected above were conducted in accord with TAPPI Method T432. It is reported as the time in seconds to absorb a drop of water having a volume of 0.1 ml.

The moisture content reflected in the above reported test is that existing in the specimen at 50% relative humidity and 23° C., measured in accord with TAPPI Method T412.

From the results of the above tests, it can be seen that we prefer a chipboard panel having a critical wax strength number range of approximately 8-11 and a water absorbency of approximately 45-56 seconds. The moisture content is preferably 6.2-6.3%.

In use, our multiple disposable animal litter container is assembled as shown in FIG. 2 and offered for sale as shown in FIG. 1. Thus, we are able to present for sale a single container which when opened provides a pair of separate and effective cardboard litter boxes 11 and 12, each with a separate bag of litter 13,14 and each completely disposable, as by burning. Moreover, each such litter box is so constructed and arranged as to absorb and retain the moisture from all animal discharges which may be deposited upon the litter. As a consequence, there is substantially less odor and the litter boxes may be used an appreciably longer period of time.

The high degree of absorbency of the paper panels 24, which are comprised of newspaper print paper, is very effective in drawing away the moisture initially absorbed from the animal discharge by the chipboard panel 25. Thus the moisture is drawn and retained behind the panel 25. The hard outer surface of the latter is particularily effective in protecting the panels 24 against scratching, such as is normally indulged in by cats in conjunction with their body discharge, since they inherently seek to cover up such discharges by scratching earth (or litter) thereover. We have found our unique combination particularily effective and satisfactory in protecting against damage normally caused by such activity if anything other than a plastic or metal container (neither of which are readily disposable) are utilized.

In considering this invention, it should be remembered that the present disclosure is illustrative only and the scope of the invention should be determined by the appended claims.

What is claimed is:

1. A sales package for litter comprising:
   (a) a closed two-piece litter container having a waxed cardboard top section and a waxed cardboard bottom section, one of which in closing telescopes into the other;
   (b) each of said sections having a central bottom panel having lateral edges, and having opposite side walls and opposite end walls extending normally and outwardly in the same direction from the edges of its said central bottom panel and defining therewith an open box, with its said central bottom panel constituting the bottom of the box;
   (c) a plurality of high moisture absorptive capacity paper panels lining each of said central bottom panels in superimposed relation and extending in contiguous superimposed relation to each other and between said end and side walls of the box;

(d) a pair of strong but highly porous cardboard protector panels, one each of which is disposed contiguous to and superimposed relative to said high absorptive capacity paper panels and extends between the side and end walls of one of said sections, said protector panels each having a highly porous and highly scratch-resistant surface facing outwardly away from its said contiguous highly absorbent paper panels; and (e) a pair of separate packages of litter disposed between said protector panels and each contained within said container during storage and sale whereby the contents of each may be utilized in conjunction with one of said sections as a readily disposable litter box when the container is opened.

2. The structure defined in claim 1 wherein said protector panels are made of plain chip grade chipboard having a surface hardness factor of a critical wax strength number of no less than eight (8).

3. The structure defined in claim 1 wherein said protector panels are made of chipboard having a surface hardness factor of a critical wax strength number range of approximately 8–11 and a water absorbency of approximately 45–56 seconds.

4. The structure defined in claim 1 wherein said high moisture absorptive capacity panels have a collective water absorbency of approximately 190 seconds.

5. The structure defined in claim 1 wherein said protector panels are made of chipboard approximately 0.030 inch thick and weighing approximately 103 lbs. per 1000 sq. ft. and having a moisture content of approximately 5%, and said high moisture absorptive capacity panels are made of 30 lb. newspaper print and approximate five (5) in number.

6. The structure defined in claim 1 wherein said paper panels have a collective moisture absorptive capacity of approximately 250%.

7. The structure defined in claim 1 wherein said paper panels have a collective Cobb size of approximately 240 grams per square meter.

8. A double, disposable litter box comprising:
(a) a closed two-piece litter container having a waxed cardboard top section and a waxed cardboard bottom section, one of which is telescoped into the other;
(b) each of said sections having a central bottom panel having lateral edges, and having opposite side walls and opposite end walls extending normally and outwardly in the same direction from said edges of said central bottom panel and defining therewith an open box, with said central bottom panel constituting the bottom of the box;
(c) a pair of highly porous cardboard protector panels, one each of which is disposed adjacent to and superimposed with respect to one of said central bottom panels and extends between the adjacent side and end walls, each of said protector panels having a highly scratch-resistant surface facing outwardly;
(d) a plurality of high moisture absorptive capacity paper panels contiguously disposed between each of said central bottom panels and its superimposed protector panel and extending in superimposed contiguous relation to each other between the side and end walls associated therewith; and
(e) a pair of separate packages of litter disposed and contained between said protector panels during storage and sale whereby the contents of each may be utilized in conjunction with one of said sections as a readily disposable litter box when the container is opened.

9. A disposable litter box comprising:
(a) a waxed all-cardboard container section having a central bottom panel with lateral edges, and opposite side walls and opposite end walls extending normally and outwardly in the same general direction from said edges of said central panel and defining therewith an open box, with said central bottom panel constituting the bottom of the box;
(b) a strong imperforate but porous flat cardboard protector panel superimposed relative to said central bottom panel and extending closely adjacent thereto between said side and end walls, said protector panel having a highly porous scratch-resistant surface facing outwardly of the box for supporting litter thereupon; and
(c) a plurality of high moisture absorptive capacity paper panels contiguously superimposed upon each other and disposed between said central bottom panel and said protector panel in contiguous relation therewith and extending between said side and end walls for effectively absorbing and retaining moisture from litter which may be deposited upon said protector panel.

10. The structure defined in claim 9, wherein said high moisture absorptive capacity panels are made of newspaper print paper having an individual absorbency of approximately 530 seconds per 0.01 cc and a collective water absorptive capacity of approximately 250%.

11. The structure defined in claim 9, wherein said high moisture absorptive capacity paper panels have an individual absorbency of approximately 530 seconds per 0.01 cc and a collective absorptive capacity of approximately 250%.

12. The structure defined in claim 9, wherein said highly absorbent paper panels have a collective absorptive capacity of 250% and have a collective absorbency of approximately 190 seconds per 0.01 cc.

13. The structure defined in claim 9, wherein said protector panel is made of chipboard of plain chip grade having a moisture content of approximately 5% by weight, a thickness approximating 0.030 inches, and a basis weight of approximately 103 lbs. per 1000 sq. ft.

14. The structure defined in claim 9, wherein the upper surface of said protector panel has a hardness factor of a critical wax strength range number of approximately 8–11.

15. The structure defined in claim 9, wherein said high moisture absorptive capacity paper panels are made of newpaper print and have collective absorbency of approximately 190 second per 0.01 cc and a collective absorptive capacity of approximately 250% and said protector panel is made of chipboard having a hardness factor of a critical wax strength number of at least eight (8).

16. The structure defined in claim 9, wherein said protector panel has an upper surface having a hardness factor of a critical wax strength number of approximtely 8–11 and is made of chipboard of plain chip grade having a moisture content of approximately 5% by weight, a thickness approximately 0.030 inches, and a basis weight of approximately 103 lbs. per 1000 sq. ft.

17. A disposable litter box comprising:
(a) an all-cardboard container section having a central panel with lateral edges, and opposite side walls and opposite end walls extending normally and outwardly in the same general direction from the edges of said central panel and defining therewith an open box, with said central panel constituting the bottom of the box;

(b) a strong imperforate but porous flat cardboard protector panel superimposed relative to said central panel and extending between said side and end walls, said protector panel having a porous scratch-resistant surface facing outwardly of the box for supporting litter thereupon; and (c) a plurality of highly absorbent paper panels contiguously superimposed upon each other and disposed between said central panel and said protector panel in contiguous relation therewith and extending between said side and end walls for effectively absorbing moisture from litter which may be supported by said protector panel; and (d) said protector panel having an outer surface having a hardness factor of a critical wax strength number of approximately 8-11.

18. The structure defined in claim 17 wherein said highly absorbent paper panels approximate 5 in number.

19. The structure defined in claim 17 wherein said plurality of highly absorbent paper panels have a collective moisture absorptive capacity approximating 250%.

20. The structure defined in claim 17 wherein said highly absorbent paper panels have a collective water absorbency approximating 190 seconds and have a collective moisture absorptive capacity approximating 250%.

21. The structure defined in claim 19 wherein said highly absorbent panels approximate 5 in number and said protector panel has a water absorbency of approximately 45-56 seconds.

* * * * *